(12) United States Patent
Ishizaki et al.

(10) Patent No.: US 6,330,126 B1
(45) Date of Patent: Dec. 11, 2001

(54) SPINDLE MOTOR HAVING TEMPERATURE COMPENSATION MEMBER ENCIRCLING HUB BODY AROUND BEARING

(75) Inventors: Hirokazu Ishizaki, Kawasaki; Shinji Tsukada, Yamagata, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/162,621

(22) Filed: Sep. 29, 1998

(30) Foreign Application Priority Data

Jun. 19, 1998 (JP) .................................................. 10-172740

(51) Int. Cl.$^7$ ..................................................... G11B 19/20
(52) U.S. Cl. ....................................... 360/99.08; 310/67 R
(58) Field of Search ............................. 360/98.07, 99.04, 360/99.08; 369/266; 310/67 R

(56) References Cited

U.S. PATENT DOCUMENTS

| | | | |
|---|---|---|---|
| 4,775,906 | * 10/1988 | Suzuki et al. | 360/98.08 |
| 5,160,865 | * 11/1992 | Gururangan | 310/67 R |
| 5,373,407 | * 12/1994 | Stupak, Jr. et al. | 360/99.08 |
| 5,594,606 | * 1/1997 | Hans et al. | 360/99.08 |

* cited by examiner

Primary Examiner—Brian E. Miller
(74) Attorney, Agent, or Firm—Greer, Burns & Crain, Ltd.

(57) ABSTRACT

The spindle motor comprises a stationary axis fixed to a housing of a recording disk apparatus, and a hub body supported around the stationary axis by upper and lower ball bearings for rotation. A member serves to at least partly surround the hub body around the upper and lower ball bearings. Thermal expansion of the hub body may be suppressed by the member having a thermal expansion coefficient smaller than that of the hub body.

17 Claims, 4 Drawing Sheets

SPINDLE MOTOR HAVING TEMPERATURE COMPENSATION MEMBER ENCIRCLING HUB BODY AROUND BEARING

BACKGROUND OF THE INVENTION

1. Field of the Invention

The present invention relates to a spindle motor employed in a recording disk apparatus such as a hard disk drive unit (HDD), in particular, to a spindle motor comprising a stationary axis fixed to a housing of the recording disk apparatus, and a hub body supported around the stationary axis by a bearing for rotation so as to receive a recording disk.

2. Description of the Related Art

The hub of a spindle motor employed in an HDD is often made of aluminum. One reason is to meet the demand for a lighter weight. Another reason is to allow the linear expansivity of the hub to coincide with that of an aluminum recording disk. The uniform linear expansivity is considered to avoid displacement between the recording disk and the hub, which holds the recording disk, under a temperature change.

Aluminum has a relatively large thermal expansion coefficient, $23.5 \times 10^{-6}/°$ C., so that the hub suffers from thermal expansion when the HDD is operated and the temperature rises. The thermal expansion causes the hub to expand in the radial direction, so that the rotation center may be decentered in the recording disk and/or the hub may wobble with respect to an annular outer race of the ball bearing. In particular, in case the annular outer race is made of a material, such as steel, having a thermal expansion coefficient that is relatively smaller than that of aluminum, significant eccentricity and/or wobble are expected. The eccentricity and/or wobble may cause displacement of a magnetic head off a target recording cylinder on the recording disk. Therefore, the recording density for a magnetic disk can hardly be improved unless such eccentricity and wobble are suppressed.

SUMMARY OF THE INVENTION

It is accordingly an object of the present invention to provide a spindle motor and a recording disk apparatus capable of avoiding eccentricity and/or wobble of a hub due to a temperature change.

According to the present invention, there is provided a spindle motor comprising: a stationary axis; a hub body supported around the stationary axis by a bearing for rotation; and a member encircling at least a part of the hub body around the bearing, said member having a thermal expansion coefficient smaller than that of the hub body.

When temperature rises to cause thermal expansion of the hub body, the member serves to restrain the thermal expansion of the hub body, since the member has a thermal expansion coefficient smaller than that of the hub body. Accordingly, restraint of the thermal expansion may serve to prevent the hub body from being decentered and wobbled with respect to the bearing, such as a ball bearing.

If the spindle motor is employed in a recording disk apparatus, the stationary axis is fixed to a housing of the recording disk apparatus while the hub body is adapted to receive a recording disk. Since eccentricity and wobble of the hub body can be suppressed in the spindle motor, wobble of the rotating recording disk can be prevented so that it contributes to a further improvement of the recording density of the recording disk. A recording disk apparatus may include, in addition to a magnetic disk apparatus such as an HDD, an optical disk apparatus and a photomagnetic disk apparatus.

The member is preferably cast in the hub body. If the member is cast in the hub body for fixation, it is unnecessary to finish the member with a higher dimensional accuracy, as compared with a member fit in the hub body. Moreover, the member can be formed into any shape without restriction.

Production of a spindle hub comprising the member cast in the hub body can be realized, for example, by a method of preparing a member out of material having a thermal expansion coefficient smaller than that of material for a hub body, positioning the member in a mold for forming the hub body, and pouring a melt of the material for the hub body into the mold. Soft metal such as aluminum can be selected as the material for the hub body.

A slip preventing mechanism may be formed on the surface of the hub body. The slip preventing mechanism may serve to prevent slip between the member and the hub body so as to suppress thermal expansion of the hub body along its rotation axis. The slip preventing mechanism may comprise a flange extending toward the stationary axis, or a slot formed on the surface of the member.

The member preferably comprises a cylinder continuous in an axial direction of the stationary axis. The member continuous in the axial direction may suppress thermal expansion of the hub body constantly in the axial direction of the hub body. Therefore, the hub body can be prevented from deformation caused by a local thermal expansion.

BRIEF DESCRIPTION OF THE DRAWINGS

The above and the other objects, features, and advantages of the present invention will become apparent from the following description of the preferred embodiment taken in conjunction with the accompanying drawings, wherein.

DESCRIPTION OF THE PREFERRED EMBODIMENT

Figure 1:
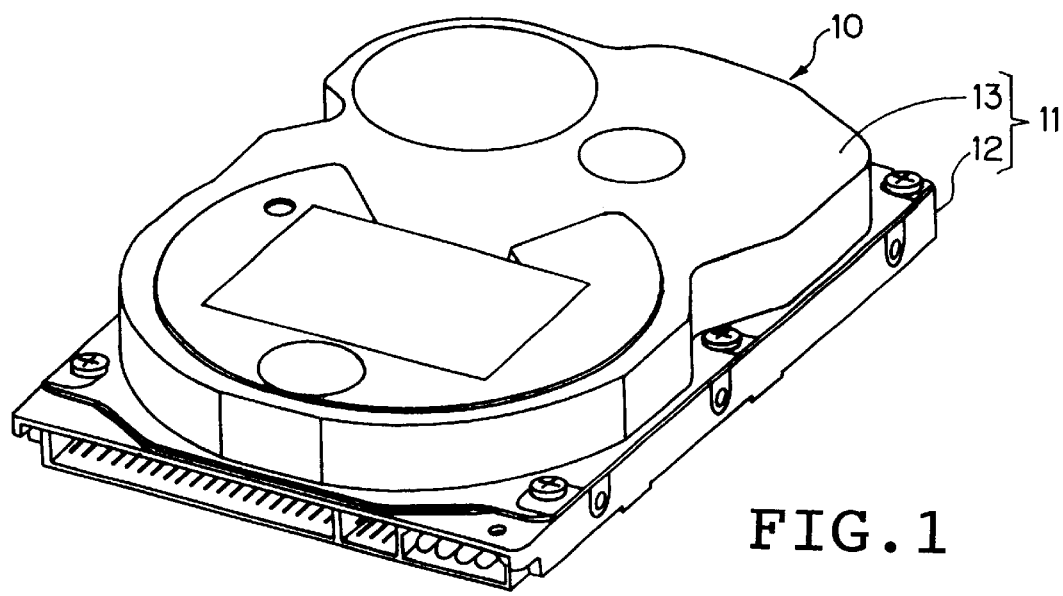
FIG. 1 is a perspective view illustrating an HDD.

FIG. 1 illustrates a hard disk drive unit (HDD) as a specific example of a recording disk apparatus. The housing 11 of the HDD 10 comprises a housing body 12, and a cover 13 superposed over the housing body 12. The HDD 10 may be incorporated in a housing of a computer, or be employed as an external recording apparatus independent of the computer.

Figure 2:
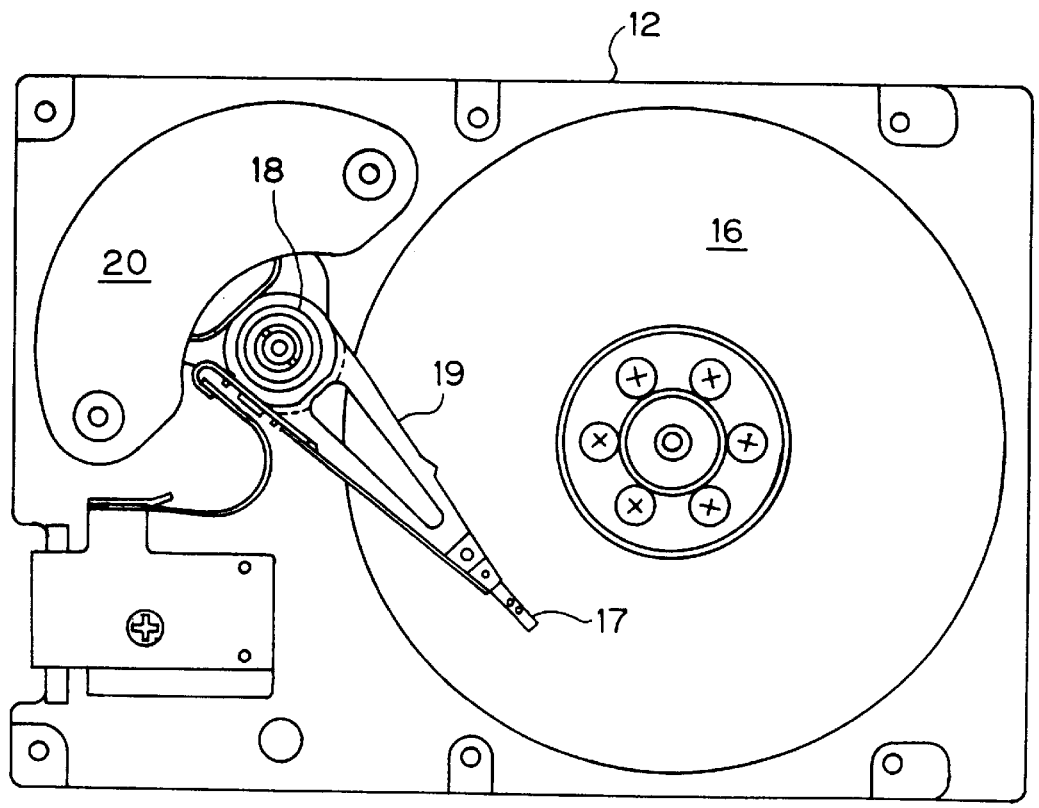
FIG. 2 is a plan view showing the inner structure of the HDD.

As shown in FIG. 2, the housing 11 accommodates a magnetic disk 16 mounted on a spindle motor of the present invention and a magnetic head 17 opposed to the magnetic disk 16. The magnetic head 17 is fixed to the tip end of a carriage arm 19 which can swing around a swinging axis 18. When information is recorded to or reproduced from the magnetic disk 16, the carriage arm 19 is driven for swinging movement by an actuator 20 comprising a magnetic circuit, so that the magnetic head 17 is positioned at a target recording track on the magnetic disk 16.

Figure 3:
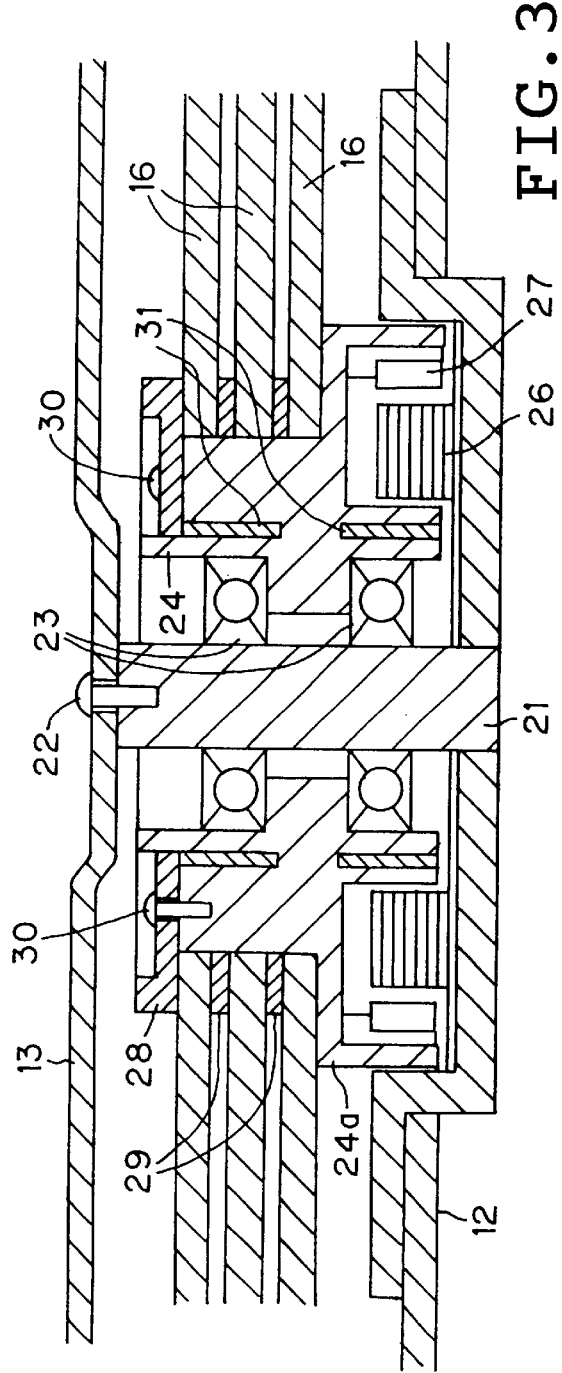
FIG. 3 is an enlarged sectional view taken along the line 3—3 in FIG. 3, illustrating a spindle motor according to an embodiment of the present invention.

As is obvious from FIG. 3, the spindle motor includes a stationary axis 21 fixed on the bottom of the housing body 12. When the cover 13 is coupled to the housing body 12, a screw 22 penetrates through the cover 13 to protrude into the tip end of the stationary axis 21. The stationary axis 21 is rigidly fixed to the housing 11 in this way.

A hub body 24 is supported around the stationary axis 21 through upper and lower ball bearings 23 for rotation. The ball bearings 23 comprise, as well known, an annular inner race fixed around the stationary axis 21, and an annular outer race fit into the hub body 24 around the annular inner race. A number of balls accommodated between the annular inner and outer races enable relative rotation of the annular inner and outer races so that the hub body 24 rotates around the stationary axis 21. Note that the ball bearings 23 may be replaced with roller bearings or other types of bearings.

The hub body 24 is driven for rotation by cooperation of a coil 26 fixed to the stationary axis 21 side and a permanent magnet 27 fixed on the hub body 24 side. The coil 26 and the permanent magnet 27 are opposed to each other. Passage of electric current through the coil 26 serves to generate magnetic force which generates a driving force in cooperation with the permanent magnet 27.

The magnetic disk 16 is mounted around the outer periphery of the hub body 24. Specifically, the magnetic disk 16 is clamped for fixation to the hub body 24 between an outward flange 24a formed on the outer periphery of the hub body 24 and a clamp 28 fixed to the tip end of the hub body 24. Spacer rings 29 are provided between adjacent magnetic disks 16 to ensure predetermined spaces between the magnetic disks 16. The clamp 28 is, for example, fixed to the tip end of the hub body 24 by a number of screws 30.

Figure 4:
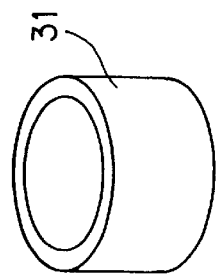
FIG. 4 is a perspective view illustrating a member.

A member 31 is provided inside the hub body 24 so as to at least partly encircle the hub body 24 around the ball bearings 23. The member 31 is for example cast within the hub body 24 for fixation to the hub body 24. The member 31 is preferably formed into an endless annular ring or cylinder, as shown in FIG. 4, employing a material having a thermal expansion coefficient smaller than that of the material used for the hub body 24. The member 31 may be made of a metallic material such as iron or a stainless steel since the member 31 should have thermal resistance during casting process and high rigidity to prevent deformation. Iron has a linear expansivity of $12.1 \times 10^{-6}/°$ C. Stainless steel in general has a linear expansivity of 11.0 to $13.0 \times 10^{-6}/°$ C. The hub body 24 and the member 31 constitute a spindle hub in cooperation.

Figure 5:
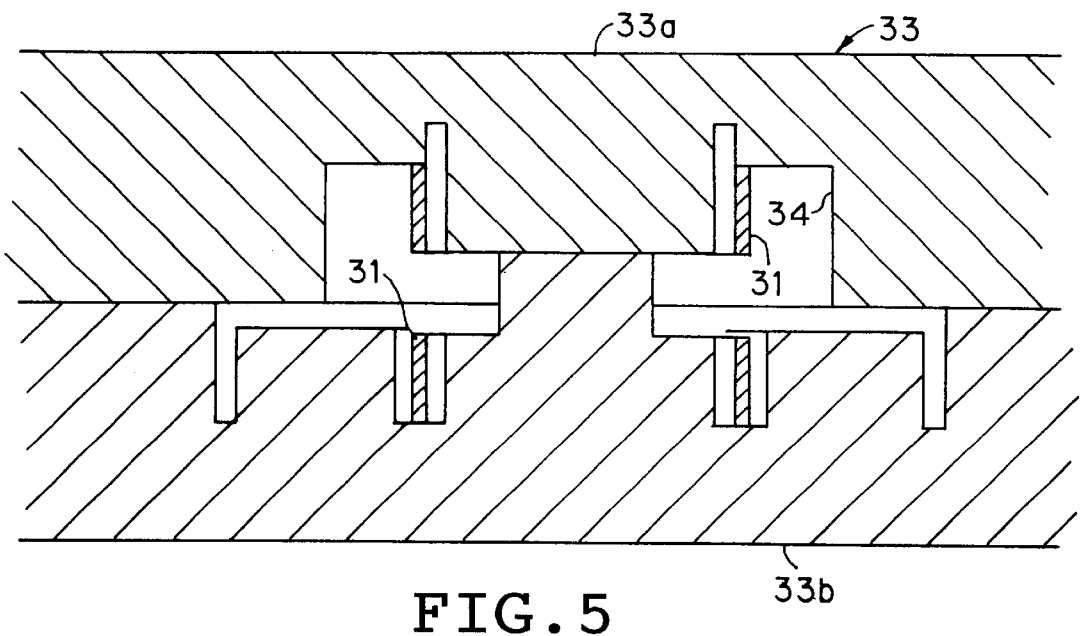
FIG. 5 is a sectional view of a mold employed to manufacture a spindle hub.

Production of the aforementioned hub body 24 may employ first preparing the member 31 as shown in FIG. 4. The member 31 can be made by casting, forging, or any other suitable manufacturing method. As shown in FIG. 5, the prepared member 31 is then set in a cavity 34 formed in a mold or die 33 for forming the hub body 24. A melt of the material for the hub body 24, i.e., aluminum, is poured into the cavity 34. When the upper and lower molds 33a, 33b is separated in the mold 33 after cooling the mold 33, a spindle hub including the member 31 cast therein is obtained. The obtained spindle hub is assembled together with the stationary axis 21, the ball bearings 23 and other parts into the spindle motor 15.

Assume that the spindle motor is assembled in the HDD 10. When the HDD 10 is operated to raise temperature, or when change in the ambient atmosphere causes temperature to rise, the hub body 24 is intended to expand by thermal expansion. The extent of the thermal expansion is determined by a product of the thermal expansion coefficient of aluminum multiplied by the size of the hub body 24.

Figure 6:
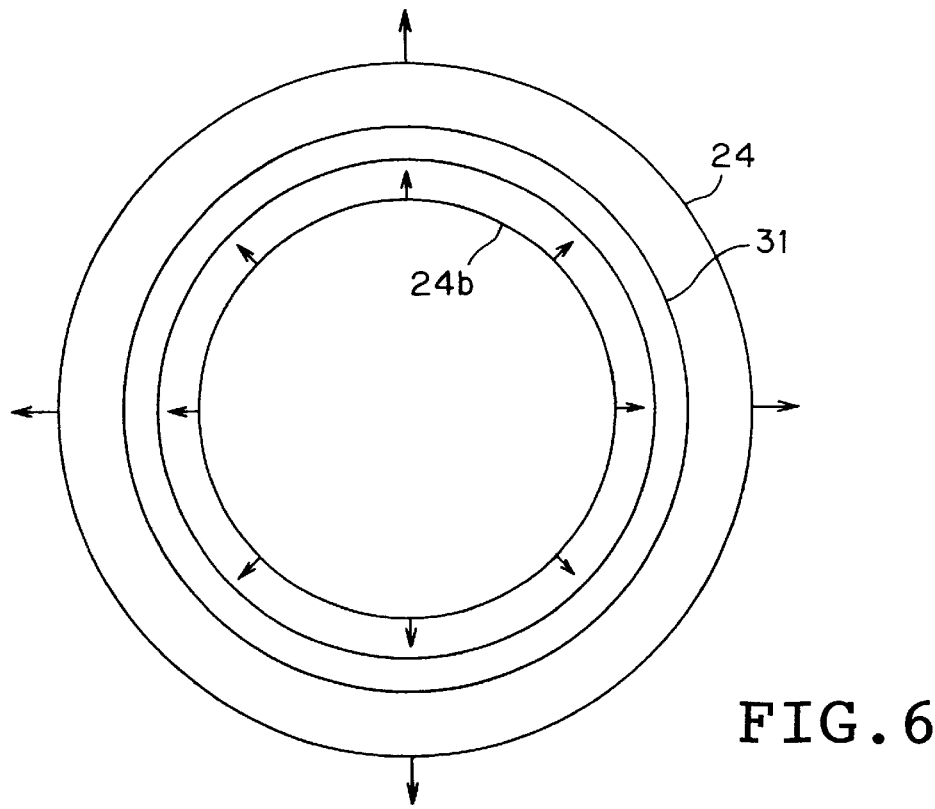
FIG. 6 is an enlarged plan view schematically showing a hub body under a thermal expansion.

Assume that the length in the radial direction (width) of the hub body 24 is significantly smaller than that in the circumferential direction, as shown in FIG. 6 for example. The thermal expansion coefficient greatly affects on the hub body 24 in the circumferential direction, so that the inner surface 24b of the hub body 24 is supposed to move away from the ball bearings 23 in the radial direction. The intended expansion conventionally may cause eccentricity of the hub body 24 to its rotation axis, or wobble of the hub body 24 with respect to the annular outer race of the ball bearings 23. According to the present invention, however, the member 31 cast in the hub body 24 serves to suppress the intended expansion because the member 31 has a thermal expansion coefficient smaller than that of the hub body 24. Accordingly, eccentricity and wobble of the hub body 24 can be suppressed to the utmost. Wobble in the rotating spindle hub can be suppressed, which resultantly suppresses vibration or wobble of the magnetic disk 16. It is possible to provide the magnetic head 17 with accurate tracking operation.

Figure 9:
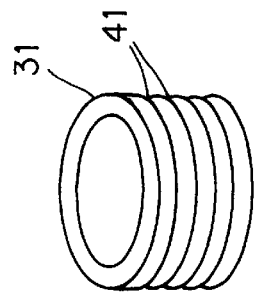
FIG. 9 is a perspective view illustrating a further modified example of the member.
Figure 7:
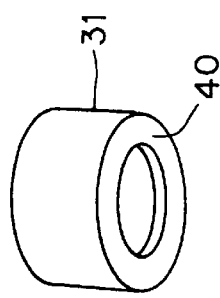
FIG. 7 is a perspective view illustrating a modified example of the member.
Figure 8:
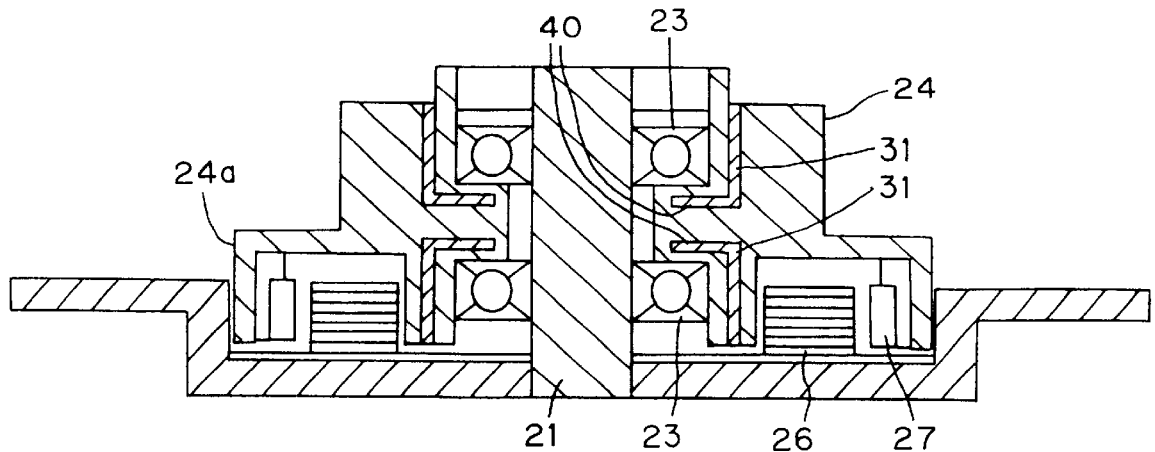
FIG. 8 is an enlarged sectional view of a spindle motor with the member shown in FIG. 7.

A slip preventing mechanism may be formed on the surface of the member 31. The slip preventing mechanism is adapted to prevent slip between the member 31 and the hub body 24 to thereby suppress thermal expansion of the hub body 24 along the rotation axis. The slip preventing mechanism may comprise a flange 40 extending from the member 31 toward the stationary axis 21 as shown in FIGS. 7 and 8, or a slot 41 formed on the surface of the member 31 as shown in FIG. 9. The slot 41 may be a screwing groove or the like, and may be formed either on the inner or outer surface of the member 31.

Figure 10:
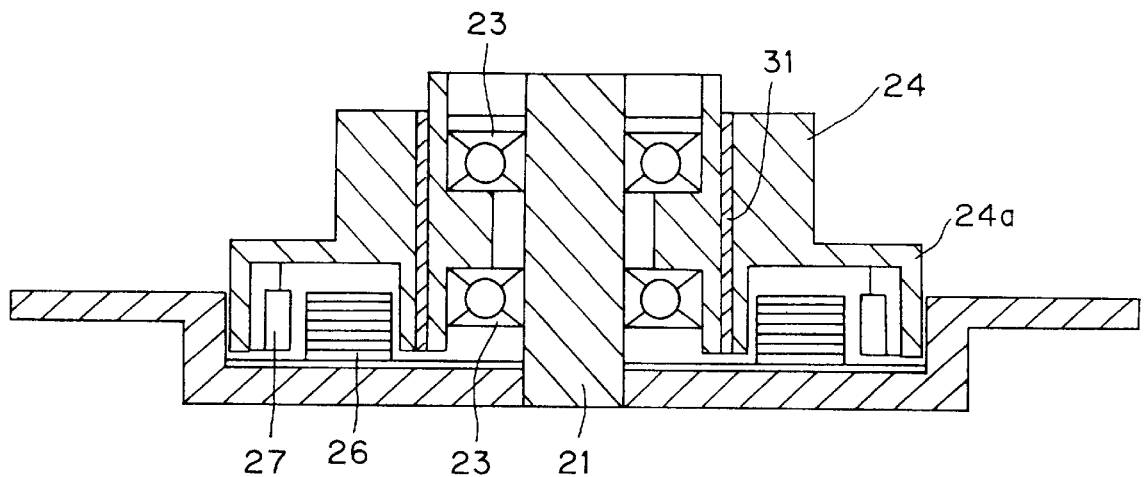
FIG. 10 is an enlarged sectional view of a spindle motor with a still further modified example of the member.
Figure 11:
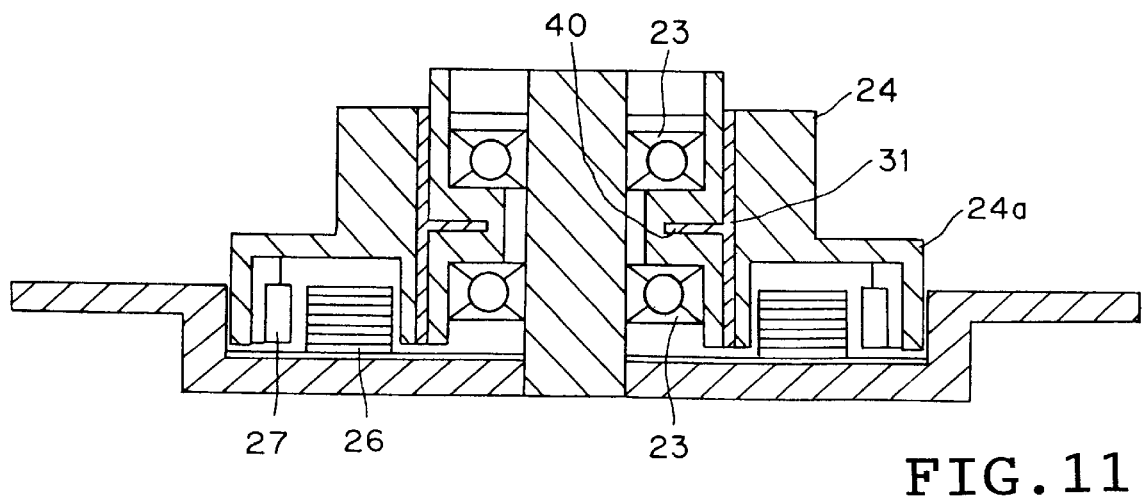
FIG. 11 is an enlarged sectional view of a spindle motor with a still further modified example of the member.

Although separate members 31 are employed to surround upper and lower bearings 23, respectively, in the above-described embodiment, a member 31 may instead comprise a cylinder continuous in the axial direction of the stationary axis 21 as shown in FIGS. 10 and 11. Employment of the continuous member 31 in the axial direction may serve to suppress thermal expansion of the hub body 24 constantly in the axial direction of the hub body 24. Therefore, the hub body 24 can be prevented from deformation caused by a local excessive thermal expansion. However, a member 31 may encircle either the upper or lower bearing 23.

Although the member 31 is cast in the hub body 24 for fixation to the hub body 24 in the above-described embodiment, it should be noted that the member 31 may be fit around the outer periphery of the hub body 24. However, if the member 31 is cast in the hub body 24, it is possible to enjoy advantages: it is not necessary to finish the member with a higher dimensional accuracy required to fit the member around the hub body 24; the shape of the member can be determined without any restriction; attachment process of the member can be eliminated; and it is possible to maintain uniformity of the resulting hub body 24.

What is claimed is:

1. A spindle motor comprising:

a stationary axis;

a unitary hub body supported around the stationary axis by a bearing for rotation; and a member embedded inside the hub body which encircles at least a part of the hub body around the bearing, said member including an inner periphery and an outer periphery, and wherein at least a portion of said inner periphery and at least a portion of said outer periphery contact said hub body;

further wherein said member has a thermal expansion coefficient that is smaller than that of the hub body.

2. The spindle motor according to claim 1, wherein the member is cast in the hub body.

3. The spindle motor according to claim 1, further including a slip preventing mechanism formed on a surface of the member.

4. The spindle motor according to claim 3, wherein said slip preventing mechanism comprises a flange extending toward the stationary axis.

5. The spindle motor according to claim 3, wherein said slip preventing mechanism comprises a slot formed on a surface of the member.

6. The spindle motor according to claim 1, wherein said member comprises a cylinder continuous in an axial direction of the stationary axis.

7. The spindle motor according to claim 1, wherein:

said bearing includes an upper bearing and a lower bearing; and said embedded member includes an upper member and a separate and distinct lower member, wherein said upper member encircles said upper bearing and said lower member encircles said lower bearing.

8. The spindle motor according to claim 7, wherein said upper member includes a first slip preventing mechanism in the form of a first flange and said lower member includes a second slip preventing mechanism in the form of a second flange.

9. A recording disk apparatus comprising:

a stationary axis fixed to a housing:

a unitary hub body supported around the stationary axis by a bearing for rotating a recording disk; and a member embedded inside the hub body which encircles at least a part of the hub body around the bearing, said member including an inner periphery and an outer periphery, and wherein at least a portion of said inner periphery and at least a portion of said outer periphery contact said hub body;

further wherein said member has a thermal expansion coefficient that is smaller than that of the hub body.

10. The recording disk apparatus according to claim 9, wherein the member is cast in the hub body.

11. The recording disk apparatus according to claim 9, further including a slip preventing mechanism formed on a surface of the member.

12. The recording disk apparatus according to claim 11, wherein said slip preventing mechanism comprises a flange extending toward the stationary axis.

13. The recording disk apparatus according to claim 11, wherein said slip preventing mechanism comprises a slot formed on a surface of the member.

14. The recording disk apparatus according to claim 9, wherein said member comprises a cylinder continuous in an axial direction of the stationary axis.

15. The recording disk apparatus according to claim 9, wherein:

said bearing includes an upper bearing and a lower bearing; and said embedded member includes an upper member and a separate and distinct lower member, wherein said upper member encircles said upper bearing and said lower member encircles said lower bearing.

16. The recording disk apparatus according to claim 15, wherein said upper member includes a first slip preventing mechanism in the form of a first flange and said lower member includes a second slip preventing mechanism in the form of a second flange.

17. The recording disk apparatus according to claim 15, wherein said upper member and said lower member each include a slip preventing mechanism in the form of a spiral slot.

* * * * *

UNITED STATES PATENT AND TRADEMARK OFFICE
CERTIFICATE OF CORRECTION

PATENT NO. : 6,330,126 B1
DATED : December 11, 2001
INVENTOR(S) : Ishizaki et al.

It is certified that error appears in the above-identified patent and that said Letters Patent is hereby corrected as shown below:

<u>Title page,</u>
Item [56], References Cited, the following references were not cited in the issued patent:

U.S. PATENTS

| PATENT NO. | PATENTEE | ISSUE DATE |
|---|---|---|
| 5,112,147 | Imamura et al. | May 12, 1992 |

FOREIGN PATENTS

| DOCUMENT NO. | COUNTRY | PUBLICATION DATE |
|---|---|---|
| 1-290164 | Japan | Nov. 22, 1989 |
| 2-220284 | Japan | Sep. 3, 1990 |
| 3-230366 | Japan | Oct. 14, 1991 |
| 3-54782 | Japan | Mar. 8, 1991 |
| 41 03 825 A1 | Germany | Aug. 29, 1991 |

Signed and Sealed this

Twentieth Day of August, 2002

Attest:

Attesting Officer

JAMES E. ROGAN
*Director of the United States Patent and Trademark Office*